United States Patent [19]

McKewan

[11] 4,432,682
[45] Feb. 21, 1984

[54] THREADED FASTENER ASSEMBLY

[75] Inventor: Arthur J. McKewan, Rochester, Mich.

[73] Assignee: Microdot Inc., Greenwich, Conn.

[21] Appl. No.: 966,279

[22] Filed: Dec. 4, 1978

[51] Int. Cl.³ .............................................. F16B 39/30
[52] U.S. Cl. .................................................. 411/311
[58] Field of Search .............................. 85/15, 325, 46; 151/14 R, 21 R, 22 R, 21 B; 411/311

[56] References Cited

U.S. PATENT DOCUMENTS

| | | | |
|---|---|---|---|
| 658,085 | 9/1900 | Higbee . | |
| 1,657,244 | 1/1928 | Dardelet | 151/14 R |
| 1,697,118 | 1/1929 | Hoke | 151/14 R |
| 1,702,878 | 2/1929 | Mersfelder et al. | 151/14 R |
| 1,798,604 | 3/1931 | Hoke | 151/14 R |
| 1,817,295 | 8/1931 | Dardelet | 151/14 R |
| 1,828,856 | 10/1931 | Bridges | 151/14 R |
| 1,884,973 | 10/1932 | Hoke | 151/14 R |
| 1,893,067 | 1/1933 | Arenz | 151/14 R |
| 1,905,869 | 4/1933 | Hoke | 151/14 R |
| 1,946,860 | 2/1934 | Kielland | 151/14 R |
| 1,961,003 | 5/1934 | Lamond | 10/141 |
| 1,981,399 | 11/1934 | Thomson . | |
| 2,091,788 | 8/1937 | McManus | 151/14 R |
| 2,371,365 | 3/1945 | Tomalis et al. | 151/14 R |
| 2,405,402 | 8/1946 | Carter | 151/22 |
| 2,437,638 | 3/1948 | Evans | 151/22 |
| 2,473,752 | 6/1949 | Johnson | 151/14 R |
| 2,581,690 | 1/1952 | Moehle et al. | 151/22 |
| 2,788,045 | 4/1957 | Rosan | 151/22 |
| 2,842,180 | 7/1958 | Brown et al. | 151/22 |
| 3,050,318 | 8/1962 | Van Der Wissel | 151/22 |
| 3,125,772 | 3/1964 | Beck | 10/111 |
| 3,247,877 | 4/1966 | Evans | 151/22 |
| 3,323,402 | 6/1967 | Gowen et al. | 85/46 X |
| 3,342,234 | 9/1967 | Evans | 151/22 |
| 3,346,278 | 10/1967 | Yocum | 85/46 |
| 3,353,581 | 11/1967 | Evans | 151/22 |
| 3,385,340 | 5/1968 | Evans | 151/22 |
| 3,433,117 | 3/1969 | Gowen et al. | 85/46 |
| 3,446,262 | 5/1969 | Phippard | 151/22 |
| 3,885,613 | 5/1975 | Evans | 151/22 |
| 3,927,503 | 12/1975 | Wilson | 151/22 |
| 4,076,064 | 2/1978 | Holmes | 151/22 |

FOREIGN PATENT DOCUMENTS

| | | | |
|---|---|---|---|
| 27170 | 12/1930 | Australia | 151/14 R |
| 2355189 | 5/1974 | Fed. Rep. of Germany | 151/22 |
| Ad.29632 | 5/1925 | France | 151/14 R |
| 600631 | 11/1925 | France | 151/14 R |
| 720079 | 11/1931 | France . | |
| Ad.40199 | 1/1932 | France | 151/14 R |
| 73897 | 6/1929 | Sweden | 151/14 R |
| 129892 | 10/1950 | Sweden . | |
| 194042 | 1/1965 | Sweden | 85/46 |
| 26071 | 11/1913 | United Kingdom | 151/14 R |
| 331387 | 7/1930 | United Kingdom | 151/14 R |
| 335598 | 9/1930 | United Kingdom | 151/14 R |
| 1373090 | 11/1974 | United Kingdom | 151/22 |

OTHER PUBLICATIONS

World Screw Thread Forms American Machinist-/Metalworking Manufacturing, 6/12/1961, p. 129, 6/26/1961, pp. 93, 95, 7/10/1961, p. 111, 7/24/1961, pp. 105, 107, 8/21/1961, pp. 119, 121.

*Primary Examiner*—Thomas J. Holko
*Attorney, Agent, or Firm*—Lyman R. Lyon

[57] ABSTRACT

In a fastener assembly of the type in which both the internal and external threads have wedge ramp root and crest sections, one of the thread forms is asymmetric so that its following flank has a different flank angle than its leading flank and different from the corresponding following flank of the other thread.

4 Claims, 4 Drawing Figures

THREADED FASTENER ASSEMBLY

BRIEF SUMMARY OF THE INVENTION

It is the purpose of this invention to improve the load distribution between the internal and external threads of a wedge ramp type threaded assembly. The invention accomplishes this purpose by changing the following flank angle of the external or internal threads to keep the following flanks out of contact and increase the amount of thread load between the crest of the external thread and the root of the internal thread.

DETAILED DESCRIPTION OF THE INVENTION

Figure 1:
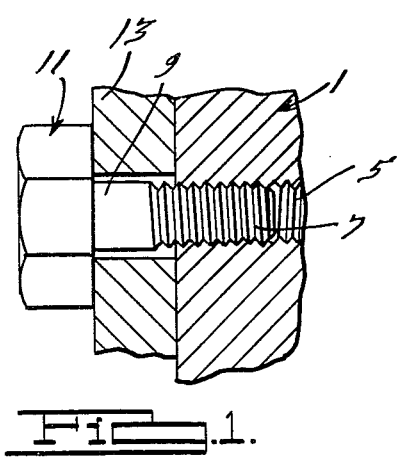
FIG. 1 is a cross section through a threaded assembly having thread configurations embodying the invention.
Figure 2:
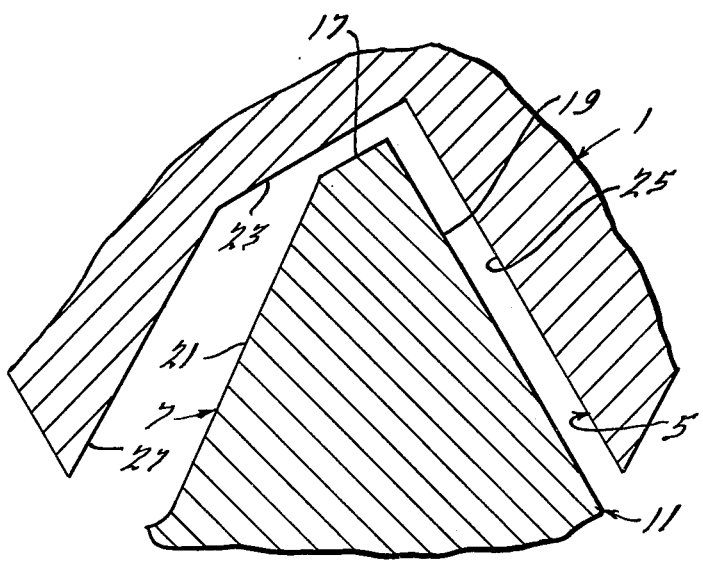
FIG. 2 is an enlarged cross sectional view through one of the internal and external thread assemblies in the unloaded condition wherein the external thread is modified.
Figure 3:
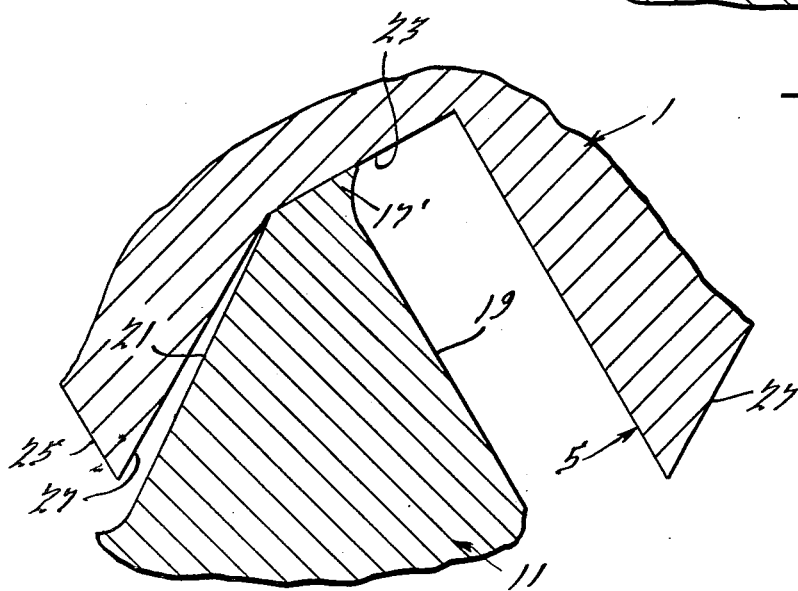
FIG. 3 is a view similar to FIG. 2 but shows the relationship of the internal and external threads as load is applied.

In FIG. 1 a member 1 has an aperture 3 which is provided with internal V-shaped helical threads 5 of the known wedge ramp type, such threads being disclosed in U.S. Pat. No. 4,076,064. The threads 5 receive the external V-shaped helical threads 7 on the shank 9 of a hex headed bolt 11 which serves to attach a member 13 against the face 15 of the member 1. While the member 1 may be an ordinary nut, the form of the invention shown in FIGS. 2 and 3 is of particular value if it is a casting, forging, or large part since in these cases it is likely that the bolt threads 7 will be considerably harder than the nut threads 5. When there is this condition, failure tends to occur at lower vibration amplitudes than when the respective threads have substantially the same hardness.

The invention provides means to reduce the effect of a substantial hardness differential between the internal and external threads. This is accomplished by a bolt thread design aimed to reduce the stress on engaged thread surfaces and to apply thread load to the wedge ramp root sections of the internal threads 7 in preference to the following flanks thereby taking advantage of the hoop strength of the material surrounding the threads.

The bolt 11 preferably has a crest 17 extending between a leading flank 19 and a following flank 21, the ramp and flanks preferably being straight as shown on the drawings. The nut or internally threaded member 1 has a wedge ramp root section 23 which extends between leading flank 25 and following flank 27, all preferably being straight as shown. The ramps define parallel, engageable surfaces and preferably make angles of 90° with their respective leading flanks.

While the internal threads are symmetrical with flanks 25 and 27 having flank angles of preferably 30°, in accordance with the form of the invention shown in FIGS. 2 and 3 the external bolt threads 7 are asymmetric with the following flank 21 having a smaller flank angle than the leading flank 19. In the embodiment illustrated the leading flank 19 has an angle of 30° with an imaginary plane normal to the axis of the threads to correspond to that of flank 25 and the following flank 21 has a smaller angle, e.g. 26° 30′, so that it does not correspond to the angle of flank 27. This relationship enables added load to be taken on the threads before the following flanks 21 and 27 come into contact and more load to be taken on ramp 23.

In use, when sufficient torque is applied to the bolt 11 to remove the clearance shown in FIG. 2 between its external threads 7 and the internal threads 5, the crest 17 will come into contact with the wedge ramp 23 adjacent the leading flank 25. With continued application of torque, clearances will be taken up and some elongation may occur and the crest 17 will move down the ramp 23 in the direction of decreasing ramp diameter so that the two following flanks 21 and 27 approach each other. Deformation of the crest 17 may take place as shown at 17'.

Figure 4:
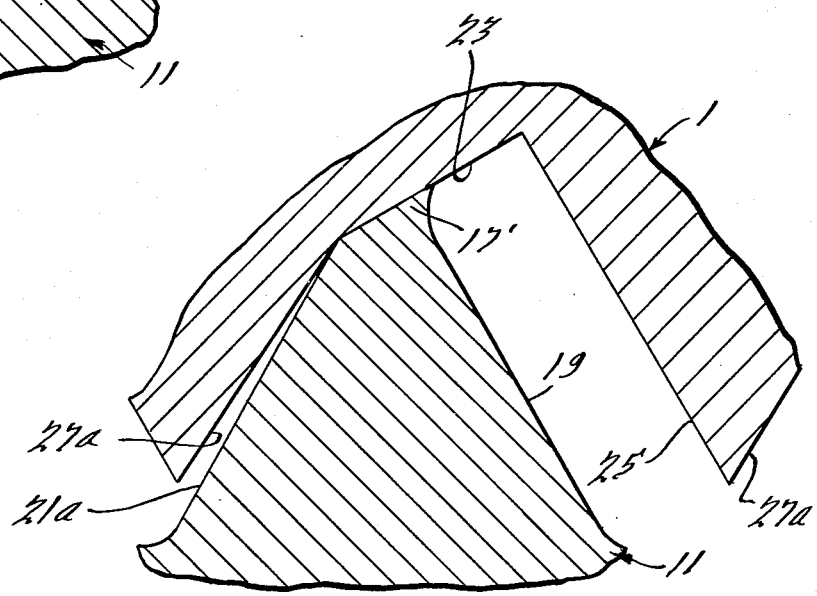
FIG. 4 is a view similar to FIG. 3 but showing a modified form wherein the internal thread is modified.

Internal thread load is taken only on the ramp 23 as the crest 17 moves from one end toward the other of the internal ramp 23. With ordinary thread configurations, when the heavy load position of FIG. 4 is reached, the flanks would come into contact and commence to carry the load creating bending load in the threads. However, with the asymmetric bolt threads of this invention there is still a clearance between the flanks 21 and 27 and the load remains on the ramp 23 which provides for optimum resistance to the effects of vibration. Continued application of load may cause bending of the bolt thread 7 so that its flank 21 gradually comes in contact with flank 27. Such bending stores elastic energy and resists loosening. However, before this condition is reached added load has been carried by the ramp 23 and during this stage the threaded assembly has more vibration resistance than one in which the internal and external following flanks are on the same angle. It is to be noted that load on the internal threads becomes a hoop stress adjacent the root of the thread rather than a bending stress in the threads thereby minimizing deflection or bending of the internal threads.

FIG. 4 illustrates a form of the invention in which clearance between the following flanks is obtained by modifying the internal threads so that they are asymmetric with respect to flank angles. In this form the angle of following flank 27a is a little larger than that of flank 27 and the external thread following flank 21a of the bolt 11 is symmetrical with leading flank 19, i.e., has a flank angle of 30°. This keeps the load on the ramp 23 with the advantages mentioned above.

In order to maximize the advantages of both embodiments of the invention, the external thread form 7 has a crest 17 in the form of a wedge ramp complementary to ramp 23 so that parallel surfaces come into engagement to reduce unit thread stress at the area of contact. Other modifications may be made without departing from the spirit and scope of the invention.

I claim:

1. A threaded fastener assembly comprising a body having an internal aperture provided with internal modified V-shaped helical threads and a bolt having a shank provided with complementary external modified V-shaped helical threads to mate with said internal helical threads, said internal threads having an internal thread configuration comprising a leading flank and a following flank and a wedge ramp root section extending between the leading and following flanks, said leading flank and following flank being symmetrical and making an angle A with an imaginary plane normal to the axis of the threads, said external threads having an external thread configuration comprising a leading flank and a following flank and a crest between the leading and following flanks, the leading and following flanks of said external thread configuration being asymmetrical and said external thread leading flank making said angle A with said plane and said external thread following flank making an angle that is less than A with said plane whereby clearance is provided between the internal and external following flanks and contact is between said crest and said wedge ramp, said internal and external threads being sized and proportioned so that substantially all load is transferred by contact between said crest and said ramp and there is substantially no bending load on the flank of the internal thread.

2. A threaded assembly as set forth in claim 1 wherein said flanks and ramp are straight, said angle A being substantially 30° and said wedge ramp making an angle of substantially 90° with its leading flank.

3. A threaded fastener assembly comprising a body having an internal aperture provided with internal modified V-shaped helical threads and a bolt having a shank provided with complementary external modified V-shaped helical threads to mate with said internal helical threads, said internal threads having an internal thread configuration comprising a leading flank and a following flank and a wedge ramp root section extending between the leading and following flanks, said leading flank and following flank being asymmetrical and said leading flank making an angle A with an imaginary plane normal to the axis of the threads and said following flank making an angle greater than A with said plane, said external threads having an external thread configuration comprising a leading flank and a following flank and a crest between the flanks, the leading and following flanks of said external thread configuration being symmetrical and making said angle A with said plane whereby clearance is provided between the internal and external following flanks and contact is between said crest and said wedge ramp, said internal and external threads being sized and proportioned so that substantially all load is transferred by contact between said crest and said ramp and there is substantially no bending load on the flank of the internal thread.

4. A threaded assembly as set forth in claim 3 wherein said flanks and ramp are straight, said angle A being substantially 30° and said wedge ramp making an angle of substantially 90° with its leading flank.

* * * * *